United States Patent
Nakayama et al.

(10) Patent No.: US 8,980,401 B2
(45) Date of Patent: Mar. 17, 2015

(54) OPTICAL MEMBER AND METHOD OF PRODUCING THE SAME

(75) Inventors: Tomonari Nakayama, Yokohama (JP);
Kenji Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 13/349,896

(22) Filed: Jan. 13, 2012

(65) Prior Publication Data

US 2012/0183730 A1    Jul. 19, 2012

(30) Foreign Application Priority Data

Jan. 19, 2011    (JP) .................................. 2011-009059

(51) Int. Cl.
| | | |
|---|---|---|
| *B32B 3/00* | (2006.01) | |
| *B05D 5/06* | (2006.01) | |
| *G02B 1/04* | (2006.01) | |
| *C08G 73/10* | (2006.01) | |

(52) U.S. Cl.
CPC ................ *G02B 1/04* (2013.01); *C08G 73/101* (2013.01); *C08G 73/1042* (2013.01); *C08G 73/10* (2013.01); *C08G 73/1035* (2013.01); *G02B 1/111* (2013.01); *C08G 73/106* (2013.01)
USPC .......................... 428/141; 428/435; 428/473.5

(58) Field of Classification Search
CPC .. C08G 73/10; C08G 73/101; C08G 73/1035; C08G 73/1042; C08G 73/106; C08L 79/08; G02B 1/04; G02B 1/10; G02B 1/11; G02B 1/111; C09J 179/08; H01L 2924/07025; C08K 5/54; C08K 5/544; C08K 5/5455
USPC ........................................ 428/141, 435, 473.5
See application file for complete search history.

(56) References Cited

U.S. PATENT DOCUMENTS

| | | | | |
|---|---|---|---|---|
| 5,346,979 | A | * | 9/1994 | Okinoshima et al. ........... 528/26 |
| 6,313,233 | B1 | * | 11/2001 | Kurosawa et al. ............. 525/431 |
| 2008/0310026 | A1 | | 12/2008 | Nakayama |

FOREIGN PATENT DOCUMENTS

| | | |
|---|---|---|
| CN | 101646960 A | 2/2010 |
| CN | 101852873 A | 10/2010 |
| EP | 2237078 A2 | 10/2010 |
| JP | 61-171762 A | 8/1986 |
| JP | H04-248837 A | 9/1992 |
| JP | 2002-161136 A | 6/2002 |
| JP | 2002-167433 A | 6/2002 |
| JP | 2005-146072 A | 6/2005 |
| JP | 2005-163012 A | 6/2005 |
| JP | 2005-187768 A | 7/2005 |
| JP | 2005-330421 A | 12/2005 |

(Continued)

OTHER PUBLICATIONS

U.S. Appl. No. 13/581,098, filed Aug. 24, 2012, Tomonari Nakayama.

(Continued)

*Primary Examiner* — Maria Veronica Ewald
*Assistant Examiner* — Nancy Johnson
(74) *Attorney, Agent, or Firm* — Canon U.S.A. Inc., IP Division (57) ABSTRACT

Provided is an optical member where at least a layer having polyimide as a main component and a layer having a textured structure arising from a crystal containing aluminum oxide as a main component are stacked in this order. The polyimide includes a silane group in a side chain via an amide bond.

12 Claims, 1 Drawing Sheet

(56) References Cited

FOREIGN PATENT DOCUMENTS

| | | |
|---|---|---|
| JP | 2007-169304 A | 7/2007 |
| JP | 2007-183388 A | 7/2007 |
| JP | 3972600 B2 | 9/2007 |
| JP | 2007-313739 A | 12/2007 |
| JP | 2008-031268 A | 2/2008 |
| JP | 2008-050567 A | 3/2008 |
| JP | 2008-233880 A | 10/2008 |
| WO | 2005047367 A1 | 5/2005 |
| WO | 2010/100874 A1 | 9/2010 |

OTHER PUBLICATIONS

K. Tadanaga, N. Katata, and T. Minami: "Super-Water-Repellent $Al_2O_3$ Coating Films with High Transparency," J. Am. Ceram. Soc., 80 [4] 1040-42 (1997).

* cited by examiner

OPTICAL MEMBER AND METHOD OF PRODUCING THE SAME

BACKGROUND OF THE INVENTION

1. Field of the Invention

The present invention relates to an optical member showing an antireflection performance and a method of producing the optical member. More specifically, the present invention relates to an optical member suitable for stably showing a high antireflection performance for a long time in the visible to infrared region and relates to a method of producing the member.

2. Description of the Related Art

It is known that an antireflection structure having a fine periodic structure of not larger than the visible light wavelength shows an excellent antireflection performance in a wide wavelength region when the fine periodic structure has an appropriate pitch and height. As a method for forming a fine periodic structure, for example, coating of a film in which fine particles having a particle diameter not larger than the wavelength are dispersed is known. In particular, it is known that a textured structure of boehmite that is aluminum oxide grown on a base material shows a high antireflection effect. The textured structure of boehmite is obtained by water vapor treatment or hot water dipping treatment of a film of aluminum oxide formed by, for example, a liquid phase process (sol-gel process) (see Non-Patent Literature: K. Tadanaga, N. Katata, and T. Minami, "Super-Water-Repellent Al2O3 Coating Films with High Transparency", J. Am. Ceram. Soc., 80(4), 1040-42, 1997). Unfortunately, in this process, the glass substrate may be damaged during exposure to water vapor or hot water.

It has been found that damage of a glass substrate by moisture or vapor can be prevented by disposing a layer of a solvent-soluble polyimide between the substrate and the textured structure of boehmite of aluminum oxide (see Japanese Patent Laid-Open No. 2008-233880). However, the layer of polyimide is low in affinity and adhesiveness to other layers including the substrate and is therefore difficult to be directly used (see Japanese Patent Laid-Open No. 61-171762). In particular, in the case where a textured structure of aluminum oxide is formed through hot-water immersion treatment, detachment between the polyimide layer and its adjacent layer or cracking in the polyimide layer itself or its adjacent layer may occur due to strain stress during formation of the textured.

In the aluminum oxide layer having a textured structure formed by a method of growing boehmite on a substrate, the method is simple and has a high productivity, and the layer shows excellent optical performance. However, erosion of the substrate or elution of the substrate component such as an alkali ion easily occurs during formation of the textured structure by immersion in hot water. Accordingly, a multilayer structure where a thin film is formed between the textured structure of boehmite and the substrate is employed for increasing the antireflection performance while preventing substrate damage. However, the multiplayer structure generates strain stress during formation of the textured structure to cause detachment between each layers or cracking.

SUMMARY OF THE INVENTION

The present invention has been made in view of the above-described circumstances of the art and provides an optical member that can maintain a highly efficient antireflection effect without causing detachment or cracking of films during manufacturing and also even after the use for a long time and provides a method of producing the optical member.

The present invention provides an optical member having a configuration described below and a method of producing the optical member.

The optical member of the present invention includes a plurality of layers formed on a surface of a substrate. The plurality of layers includes a layer having a textured structure arising from a crystal of aluminum oxide and a layer having polyimide, and the polyimide includes a repeating unit represented by Formula (1) and a structure represented by Formula (2) in a main chain:

(wherein, $R_1$ represents a tetravalent organic group; and $R_2$ represents a divalent organic group), (wherein, $R_3$ represents a tetravalent organic group; $R_4$ represents a phenylene group or a C1 to C5 alkylene group; $R_5$ represents a hydrogen atom, a linear or branched alkyl group, or a phenyl group or represents a structure binding to the substrate or another polymer through —Si≡; $R_6$ represents a hydrogen atom, a linear or branched alkyl group, or a phenyl group; m represents 0 or 1; n represents 1 or 2; m and n satisfy 2m+n=4; and x represents an integer of 1 to 3).

The method of producing the optical member of the present invention includes a step (1) of preparing a polyimide solution by adding polyimide having a repeating unit represented by the following Formula (5) and a silane compound represented by the following Formula (6) to an organic solvent, a step (2) of spreading the polyimide solution onto a substrate or a layer formed on a substrate; a step (3) of forming a polyimide thin film by drying and/or baking the spread polyimide solution; and a step (4) of forming a textured structure arising from a crystal of aluminum oxide:

(wherein, $R_{15}$ represents a tetravalent organic group; and $R_{16}$ represents a divalent organic group), (6)

(wherein, $R_{17}$ represents an oxygen atom or a sulfur atom; $R_{18}$ represents a phenylene group or a C1 to C5 alkylene group; $R_{19}$ represents a hydrogen atom or a C1 to C5 linear or branched alkyl group; $R_{20}$ represents a hydrogen atom, a linear or branched alkyl group, or a phenyl group; and z represents an integer of 1 to 3).

According to the present invention, provided is an optical member that does not have cracking, shows low unevenness in optical performance, and can stably exhibit a high antireflection effect for a long time.

Further features of the present invention will become apparent from the following description of exemplary embodiments with reference to the attached drawings.

DESCRIPTION OF THE EMBODIMENT

The present invention will be described in detail below.

Figure 1:
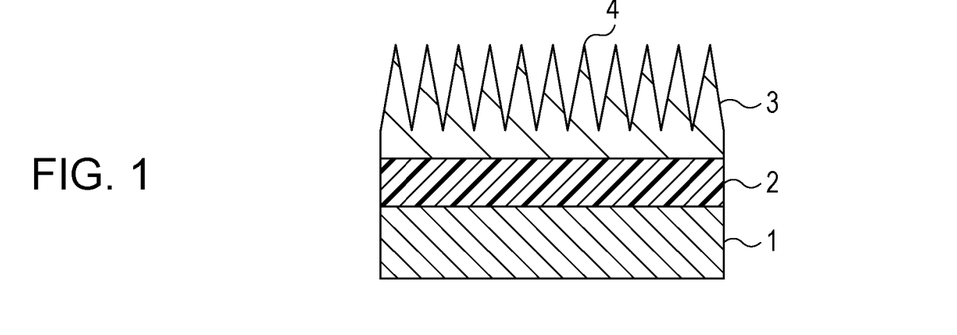
FIG. 1 is a schematic diagram illustrating an optical member according to an embodiment of the present invention.

FIG. 1 is a schematic cross-sectional view illustrating an optical member according to this embodiment. In the optical member of the present invention shown in FIG. 1, a layer 2 having polyimide and a layer 3 having a fine textured structure are stacked on a surface of the substrate 1 in this order. The outermost surface is made of the fine textured structure 4 arising from a crystal containing aluminum oxide.

The laminate (a plurality of layers) of the present invention composed of the layer 2 having polyimide and the layer 3 having a fine textured structure can suppress reflection of light generated on a surface of the substrate 1. The main component of the layer 2 having polyimide is preferably polyimide, and, more preferably, the layer 2 having polyimide is formed from polyimide alone or polyimide and a small amount of a component other than polyimide. The component other than polyimide complements the polyimide serving as the main component and is compatible or miscible with or dispersible in the polyimide within a range that does not impair the properties of the polyimide.

The layer 2 having polyimide is disposed between the substrate 1 and the layer 3 having a fine textured structure, which is characteristic and achieves a higher antireflection effect than the case where the layer 3 having a fine textured structure is directly formed on the substrate 1. Consequently, the thickness of the layer 2 having polyimide is in a range of 10 nm or more and 150 nm or less and is changed according to, for example, the refractive index of the substrate within this range. The antireflection effect in a thickness less than 10 nm is the same as that when the layer 2 having polyimide is not provided. On the contrary, a thickness greater than 150 nm significantly decreases the antireflection effect.

The polyimide constituting the layer 2 having polyimide is a solvent-soluble polyimide and includes a repeating unit represented by Formula (1) and a structure represented by Formula (2) in the main chain:

(1)

(wherein, $R_1$ represents a tetravalent organic group; and $R_2$ represents a divalent organic group), (2)

(wherein, $R_3$ represents a tetravalent organic group; $R_4$ represents a phenylene group or a C1 to C5 alkylene group; $R_5$ represents a hydrogen atom, a linear or branched alkyl group, or a phenyl group or represents a structure binding to the substrate or another polymer through —Si≡; $R_6$ represents a hydrogen atom, a linear or branched alkyl group, or a phenyl group; m represents 0 or 1; n represents 1 or 2; m and n satisfy 2m+n=4; and x represents an integer of 1 to 3).

Formula (1) represents a repeating unit of the general polyimide where an acid dianhydride moiety and a diamine moiety are alternately arranged. Formula (2) represents a structure where a carbonyl group remaining without being formed into an imide ring is linked to an alkoxysilane group via an amide bond. The alkoxyl group on the alkoxysilane group can react with water to be converted to a hydroxyl group, react with a hydroxyl group on the substrate surface to form a bond, or react with another alkoxyl group to link between the polymers with ≡Si—O—Si≡.

The polyimide having the repeating unit represented by Formula (1) includes an imide ring and an aromatic ring, an aliphatic group, etc. and is therefore poor in affinity and adhesiveness to a layer made of a different material, in particular, an inorganic material. However, introduction of a structure represented by Formula (2) into the main chain allows an alkoxysilane group or its reactive group to exist at the interface between the layer 2 having polyimide as a main component and a layer adjacent thereto or the substrate. By doing so, the affinity of the layer 2 having polyimide as a main component to the layer adjacent thereto or the substrate is increased, or the adhesiveness is increased by a reaction with the adjacent layer.

The molar quantity of the structure represented by Formula (2) contained in the solvent-soluble polyimide can be 0.002 to 0.05 based on 1 mole of the repeating unit represented by Formula (1) contained in the solvent-soluble polyimide. In the case where the molar quantity of the structure represented by Formula (2) is less than 0.002, the number of the alkoxysilane groups or its reactive groups present at the interface with the adjacent layer or the substrate is insufficient for improving the affinity or the adhesiveness to the adjacent layer or the substrate. On the contrary, a molar quantity larger than 0.05 causes a reduction in glass transition temperature or refractive index and an increase in coefficient of water absorption of the layer 2 having polyimide as a main component of the present invention.

The solvent-soluble polyimide of the present invention mainly has a repeating unit represented by Formula (1), and the structure can be synthesized by a usual method performing a polyaddition reaction and a cyclodehydration reaction (imidization reaction) of an acid dianhydride and a diamine. Accordingly, the tetravalent organic acid introduced to $R_1$ in Formula (1) is determined depending on the acid dianhydride that is used in the polymerization. The structure represented by Formula (2) includes a carbonyl group remaining without being formed into an imide ring during the imidization, and the tetravalent organic group introduced to $R_3$ in the formula is similarly determined depending on the acid dianhydride.

Examples of the acid dianhydride used in the synthesis of the polyimide include dianhydrides of aromatic acids such as pyromellitic anhydride, 3,3'-biphthalic anhydride, 3,4'-biphthalic anhydride, 3,3',4,4'-benzophenone-tetracarboxylic dianhydride, 3,3',4,4'-diphenyl sulfone tetracarboxylic dianhydride, 4,4'-(hexafluoroisopropylidene)diphthalic anhydride, and 4,4'-oxydiphthalic dianhydride; and dianhydrides of aliphatic acids such as meso-butane-1,2,3,4-tetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, bicyclo[2.2.2]oct-7-ene-2,3,5,6-tetracarboxylic dianhydride, bicyclo[2.2.2]octane-2,3,5,6-tetracarboxylic dianhydride, bicyclo[2.2.1]heptane-2,3,5,6-tetracarboxylic dianhydride, 5-(2,5-dioxotetrahydrofuryl)-3-methyl-3-cyclohexene-1,2-dicarboxylic anhydride, and 4-(2,5-dioxotetrahydrofuran-3-yl)-1,2,3,4-tetrahydronaphthalene-1,2-dicarboxylic anhydride. From the viewpoints of improvements in solubility, coating property, and transparency of the polyimide, 3,3',4,4'-diphenyl sulfone tetracarboxylic dianhydride, 4,4'-(hexafluoroisopropylidene)diphthalic anhydride, meso-butane-1,2,3,4-tetracarboxylic dianhydride, bicyclo[2.2.2]octane-2,3,5,6-tetracarboxylic dianhydride, bicyclo[2.2.1]heptane-2,3,5,6-tetracarboxylic dianhydride, 5-(2,5-dioxotetrahydrofuryl)-3-methyl-3-cyclohexene-1,2-dicarboxylic anhydride, and 4-(2,5-dioxotetrahydrofuran-3-yl)-1,2,3,4-tetrahydronaphthalene-1,2-dicarboxylic anhydride are more preferred.

The divalent organic group introduced to $R_2$ in Formula (1) is determined depending on the diamine that is used in the polymerization.

Examples of the diamine include aromatic diamines such as m-phenylenediamine, p-phenylenediamine, 3,4'-diaminodiphenyl methane, 4,4'-diaminodiphenyl methane, 4,4'-diamino-3,3'-dimethyldiphenylmethane, o-tolidine, m-tolidine, 4,4'-diaminobenzophenone, 1,1-bis(4-aminophenyl)cyclohexane, 3,4'-diaminodiphenyl ether, 4,4'-diaminodiphenyl ether, 1,4-bis(4-aminophenoxy)benzene, 1,3-bis(4-aminophenoxy)benzene, 2,2-bis[4-(4-aminophenoxy)phenyl]propane, 4,4'-bis(4-aminophenoxy)biphenyl, bis[4-(4-aminophenoxy)phenyl]sulfone, 4,4'-bis(3-aminophenoxy)biphenyl, bis[4-(4-aminophenoxy)phenyl]sulfone, 9,9-bis(4-aminophenyl)fluorene, 9,9-bis(4-amino-3-methylphenyl)fluorene, 9,9-bis(4-amino-3-fluorophenyl)fluorene, 2,2-bis(4-aminophenyl)hexafluoropropane, 2,2-bis(3-aminophenyl)hexafluoropropane, 2,2-bis[4-(4-aminophenoxy)phenyl]hexafluoropropane, and 2,2'-bis(trifluoromethyl)benzidine; diamines having linear or branched aliphatic groups such as 1,4-diaminobutane and 1,5-diaminopentane; diamines having alicyclic structures such as 1,3-cyclohexanediamine, 1,4-cyclohexanediamine, 1,3-bis(aminomethyl)cyclohexane, 1,4-bis(aminomethyl)cyclohexane, 4,4'-methylenebis(aminocyclohexane), 4,4'-methylenebis(1-amino-2-methylcyclohexane), 2,2-bis(4-aminocyclohexyl)propane, 4,4'-bicyclohexylamine, α,α'-bis(4-aminocyclohexyl)-1,4-diisopropylcyclohexane, isophoronediamine, norbornanediamine, adamantane-1,3-diamine, and 1,3-bis(aminomethyl)adamantane; and diorganosiloxane group-containing diamines such as 1,3-bis(3-aminopropyl)tetramethyldisiloxane, 1,4-bis(3-aminopropyldimethylsilyl)benzene, and dimethylsiloxane oligomers having amino groups on both terminals.

From the viewpoints of high reactivity, high heat resistance and solubility of the resulting polyimide, and control of the refractive index in a broad range by a specific combination, 4,4'-methylenebis(aminocyclohexane), 4,4'-bis(3-aminophenoxy)biphenyl, 9,9-bis(4-aminophenyl)fluorene, 9,9-bis(4-amino-3-methylphenyl)fluorene, and 9,9-bis(4-amino-3-fluorophenyl)fluorene are more preferred. From the viewpoints of adhesiveness to an inorganic substrate material such as glass and achievement of a lower refractive index, diorganosiloxane group-containing diamine is more preferred.

Furthermore, the solvent-soluble polyimide contained in the layer 2 having polyimide as a main component can include a structure represented by Formula (3) at a terminal:

(wherein, $R_7$ represents a tetravalent organic group; $R_8$ represents a methyl group, an ethyl group, or an isopropyl group; $R_9$ represents a phenylene group or a C1 to C5 alkylene group; $R_{10}$ represents a hydrogen atom, a C1 to C5 linear or branched alkyl group, or a phenyl group or represents a structure binding to the substrate or another polymer through —Si≡; $R_{11}$ represents a hydrogen atom, a linear or branched alkyl group, or a phenyl group; y represents an integer of 1 to 3; and p represents 0 or 1).

Formula (3) represents a structure where a carbonyl group having an anhydride ring remained at a terminal in the polymerization is linked to an alkoxysilane group via an amide bond. The alkoxyl group on the alkoxysilane group can react with water to be converted to a hydroxyl group, react with a hydroxyl group on the substrate surface to form a bond, or react with another alkoxyl group to link between the polymers with ≡Si—O—Si≡. An effect similar to that by Formula (2) can be expected by introducing the structure represented by Formula (3) to a terminal, but a sufficient number of the structures cannot be introduced by the introduction to the terminal only. Accordingly, the affinity and adhesiveness to the adjacent layer is improved by coexistence with the structure represented by Formula (2).

The molar quantity of the structure represented by Formula (3) contained in the solvent-soluble polyimide can be 0 to 0.03 based on 1 mole of the repeating unit represented by Formula (1) contained in the solvent-soluble polyimide, and the sum of the molar quantities of the structure represented by Formula (2) and the structure represented by Formula (3) is not higher than 0.05. If the sum of the molar quantities of the structure represented by Formula (2) and the structure represented by Formula (3) exceeds 0.05, a reduction in glass transition temperature or refractive index and an increase in coefficient of water absorption of the layer 2 having polyimide as a main component of the present invention are caused.

Furthermore, the solvent-soluble polyimide can include a structure represented by Formula (4) at a terminal:

(wherein $R_{12}$ represents a tetravalent organic group; $R_{13}$ represents a divalent organic group; and $R_{14}$ represents a C1 to C3 alkyl group or a fluoroalkyl group).

The structure represented by Formula (4) is a structure where an amino group remained at a terminal in the polymerization is capped by amidation. The amide capping can prevent coloring of a solution or a film from occurring when the terminal amino group remains.

The tetravalent organic groups introduced to $R_7$ of Formula (3) and $R_{12}$ of Formula (4) are determined depending on the acid dianhydride that is used in the polymerization, as in $R_1$ of Formula (1). Similarly, the divalent organic group that is introduced to $R_{13}$ of Formula (4) is determined depending on the diamine used in the polymerization, as in $R_2$ of Formula (1).

A method of forming the layer 2 having polyimide as a main component of the present invention will be described below.

First, a polyimide solution is prepared by successively adding a solvent-soluble polyimide having an imidization ratio of 96 to 99.9% and having a repeating unit represented by the following Formula (5) and a silane compound represented by the following Formula (6) to an organic solvent. Then, a layer 2 having polyimide as a main component is formed through a step of spreading the polyimide solution onto a substrate or a layer formed on a substrate and a step of forming a polyimide thin film by drying and/or baking the spread polyimide solution.

(wherein, $R_{15}$ represents a tetravalent organic group; and $R_{16}$ represents a divalent organic group), (wherein, $R_{17}$ represents an oxygen atom or a sulfur atom; $R_{18}$ represents a phenylene group or a C1 to C5 alkylene group; $R_{19}$ represents a hydrogen atom or a C1 to C5 linear or branched alkyl group; $R_{20}$ represents a hydrogen atom, a linear or branched alkyl group, or a phenyl group; and z represents an integer of 1 to 3).

The repeating unit represented by Formula (5) is the same as that represented by Formula (1). Accordingly, the solvent-soluble polyimide having a repeating unit represented by Formula (5) is synthesized by reacting the above-mentioned dianhydride and diamine in a solvent to obtain a polyamic acid solution and then performing imidization.

The solvent used in the synthesis of the polyimide may be any solvent that can dissolve polyamic acid and polyimide and is usually an aprotic polar solvent, such as N,N-dimethylformamide, N,N-dimethylacetamide, or N-methyl-2-pyrrolidone.

The imidization is a method of converting polyamic acid to polyimide by cyclodehydration. The imidization is performed either a chemical imidization process or a thermal imidization process. In the chemical imidization, a tertiary amine such as pyridine or triethylamine and a dehydration catalyst such as acetic anhydride or trifluoroacetic anhydride are added to a polyamic acid solution, and the mixture is heated at 20° C. to 120° C. In the thermal imidization, xylene is added to a polyamic acid solution, and azeotropy of the mixture is performed at 150° C. or higher. In order to obtain polyimide that is transparent and less coloring at a high imidization ratio, the chemical imidization process is employed. In the chemical imidization, the amino group at the terminal of polyimide is amidated by the dehydration catalyst.

The solution of the synthesized polyimide may be directly used, but in the case of optical use, the synthesized polyimide can be reprecipitated in a poor solvent to obtain a polyimide powder. In particular, in order to remove the various reagents used in chemical imidization and unreacted monomers, the polyimide powder obtained by reprecipitation is repeatedly subjected to washing with alcohol and filtration. After thoroughly removing the reagents and monomers, the polyimide powder is dried at 20° C. or more and 200° C. or less under ordinary or reduced pressure. The imidization ratio of the resulting polyimide can be 96% or more and 99.8% or less. An imidization ratio of less than 96% increases the coefficient of water absorption and also reduces the refractive index of the polyimide. In an imidization ratio of higher than 99.8%, a silane compound hardly reacts with the polyimide not to provide an effect of increasing the affinity and adhesiveness to an adjacent layer or a substrate.

Subsequently, a silane compound is added to the polyimide solution, followed by a reaction at 20° C. or more and 60° C. or less. The silane compound is represented by Formula (6) and has isocyanate or thioisocyanate as a functional group. Specific examples of the silane compound include 3-(triethoxysilyl)propyl isocyanate. Such a functional group reacts with a carbonyl group remaining without being formed into an imide ring in the polyimide to form an amide bond. As a result, the silane group is introduced to a side chain of a polyimide via a structure represented by Formula (2). In addition, a structure represented by Formula (7) can be formed at a terminal of the polyimide:

(wherein, $R_{21}$ represents a tetravalent organic group; $R_{22}$ represents a divalent organic group; and $R_{23}$ represents a C1 to C3 alkyl group or a fluoroalkyl group). The amount of the silane compound to be added can be 0.3 parts by weight or more and 5 parts by weight or less based on 100 parts by weight of the polyimide. If the amount of the silane compound is less than 0.3 parts by weight, cracking may partially occur. If the amount is higher than 5 parts by weight, the optical performance may decrease.

In order to enhance the affinity and adhesiveness to an adjacent layer or a substrate, hydrolysis of the silane group in the solution may be accelerated. Specifically, for example, after a reaction of a silane compound with polyimide, a small amount of water is added to the solution. The amount of water to be added is 1% by mole or less based on 100% by mole of the solution. In an amount higher than this, hydrolysis of silane group proceeds too much, increasing the possibility of a decrease in solubility of the polyimide to cause precipitation or a reduction in film-forming property.

The solution of polyimide having a silane group at the side chain is applied onto a substrate so as to be in direct contact with the substrate or is applied onto a thin film disposed on a substrate so as to be in direct contact with the thin film. In the case of application so as to be in contact with a substrate, the adhesiveness to the substrate is increased to prevent detachment, cracking, and so on during manufacturing and also even after the use for a long time; elution of the substrate component such as an alkali ion can be prevented; and a high antireflection performance can be maintained. Any known application process, for example, dipping, spin coating, spraying, printing, flow coating, or a combination thereof, can be appropriately employed. In the case of application to a curved surface such as a lens surface, spin coating can be employed from the viewpoint of uniformity in film thickness.

Furthermore, the applied solution containing polyimide is dried or baked at 100° C. or more and 250° C. or less to form a layer 2 having polyimide as a main component. The drying and/or baking of the solution containing polyimide is mainly conducted for removing the solvent and is performed by heating for about 5 min to about 2 hr. The heating is necessary to be conducted by an appropriately selected method using an oven with internal air circulation, a muffle furnace, or irradiation with light, such as infrared or microwaves, radioactive rays, or electromagnetic waves.

The layer 2 having polyimide as a main component may contain a component other than polyimide in an amount that does not impair the optical characteristics, transparency, heat resistance, and water resistance of the polyimide. The amount of the component other than polyimide is less than 20 parts by weight based on 100 parts by weight of the total amount of polyimide. An amount greater than this level may deteriorate the transparency, the film strength, and the uniformity in film thickness.

In order to increase the solvent resistance of the layer 2 having polyimide as a main component, the layer 2 can contain a heat- or light-curing resin or a crosslinking agent, such as an epoxy resin, a melamine resin, or an acrylic resin. In order to adjust the refractive index or increase the hardness of the film, the layer 2 can contain a small amount of inorganic fine particles of, for example, $SiO_2$, $TiO_2$, $ZrO_2$, $SiO_2$, $ZnO$, $MgO$, or $Al_2O_3$.

The layer 3 having a fine textured structure formed on the layer 2 having polyimide as a main component of the present invention has a fine textured structure 4 formed on the outermost surface. The fine textured structure 4 arises from a crystal of aluminum oxide. The term "crystal of aluminum oxide" refers to a plate-like crystal that is deposited and grows on the outer layer of a film having aluminum oxide as a main component due to, for example, peptization of the outer layer by immersing the film in hot water. The "crystal of aluminum oxide" is referred to as plate crystal.

The layer 3 having a fine textured structure can be a layer where the refractive index continuously increases from the outer layer side toward the substrate side. This continuous increase in refractive index from the outer layer side toward the substrate side exhibits a higher effect of reducing reflectance compared with the case where layers having different refractive indices are serially stacked in such a manner that the refractive index on the substrate side is the highest.

The layer 3 having a fine textured structure arises from a crystal having an oxide of aluminum, a hydroxide of aluminum, or a hydrate of an oxide of aluminum as a main component. In particular, the crystal can be boehmite. The textured structure 4 having fine edges is formed by arranging such a plate crystal, and in order to increase the height of the fine texture and narrow the distance between the textured protrusions, the plate crystal is arranged so as to have a specific angle with respect to the substrate surface. Throughout the specification, the term "aluminum oxide" refers to an oxide of aluminum, a hydroxide of aluminum, or a hydrate of an oxide of aluminum, and the term "layer having aluminum oxide" refers to a layer of which main component is aluminum oxide, more preferably, a layer including at least one oxide layer having aluminum oxide only or 70% by mole or more of aluminum oxide and any of $ZrO_2$, $SiO_2$, $TiO_2$, $ZnO$, and $MgO$.

Figure 2:
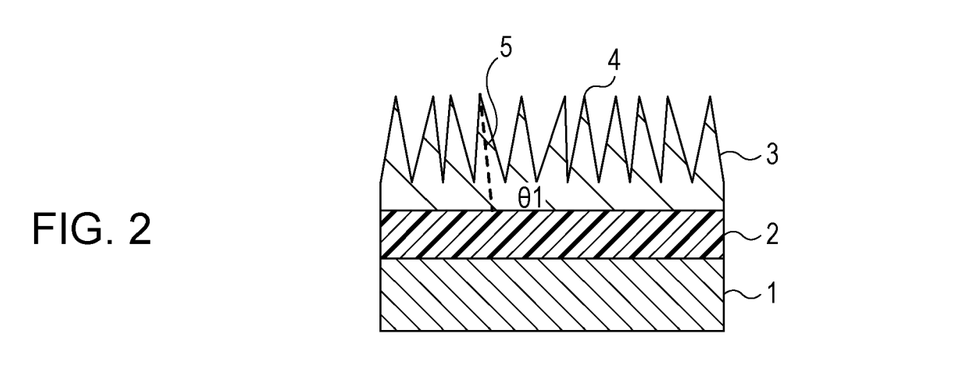
FIG. 2 is a schematic diagram illustrating an optical member according to an embodiment of the present invention.

FIG. 2 shows a case of that the surface of the substrate 1 is a plane such as a plate, film, or sheet. The plate crystal is arranged with respect to the substrate surface in such a manner that the average of angles θ1, that is, angles between the tilt directions 5 of the plate crystal and the substrate surface, is 45° or more and 90° or less, preferably 60° or more and 90° or less.

Figure 3:
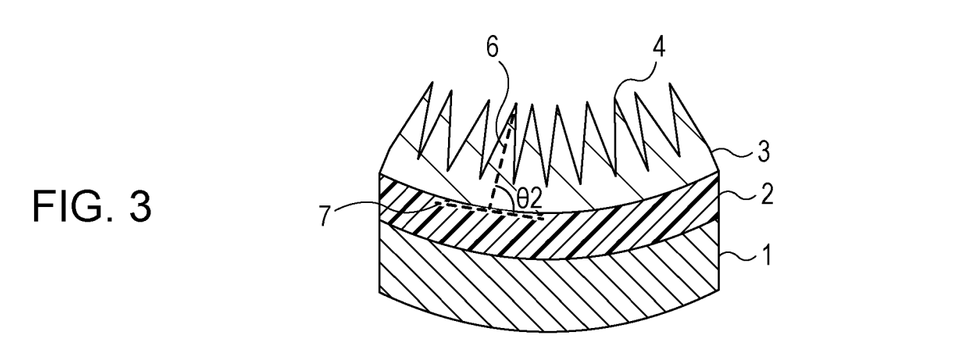
FIG. 3 is a schematic diagram illustrating an optical member according to an embodiment of the present invention.

FIG. 3 shows a case where the surface of the substrate 1 has a two-dimensional or three-dimensional curved surface. The plate crystal is arranged with respect to the substrate surface in such a manner that the average of angles θ2, that is, angles between the tilt directions 6 of the plate crystal and the tangent 7 of the substrate surface, is 45° or more and 90° or less, preferably 60° or more and 90° or less. The angles θ1 and θ2 may exceed 90° depending on the tilt of the plate crystal. In such a case, an angle measured so as to be 90° or less is used.

The thickness of the layer 3 having a fine textured structure can be 20 nm or more and 1000 nm or less, preferably 50 nm or more and 1000 nm or less. The layer 3 having a thickness of 20 nm or more and 1000 nm or less exhibits an effective antireflection performance due to the fine textured structure, does not have a risk of impairment in mechanical strength of the irregularity, and is advantageous in manufacturing cost of the fine textured structure. A thickness of 50 nm or more and 1000 nm or less can further increase the antireflection performance.

The surface density of the fine texture of the present invention is also important, and the average surface roughness Ra' value, which corresponds to the surface density and is obtained by planar extension of the center line average roughness, is 5 nm or more, more preferably 10 nm or more, and most preferably 15 nm or more and 100 nm or less. The surface area ratio Sr is 1.1 or more, more preferably 1.15 or more, and most preferably 1.2 or more and 3.5 or less.

The obtained fine textured structure can be evaluated by, for example, observation of the fine textured structure surface with a scanning probe microscope, and this observation of a film provides the average surface roughness Ra' value by planar extension of the center line average roughness Ra of the film and provides the surface area ratio Sr. That is, the average surface roughness Ra' value (nm) is obtained by applying the center line average roughness Ra defined in JIS B 0601 to a measuring surface for three-dimensional extension and is expressed as "an average value of the absolute values of the deviation from a standard face to a designated face" and is given by the following Expression (24):

$$Ra' = \frac{1}{S_0}\int_{Y_B}^{Y_T}\int_{X_L}^{X_R} |F(X,Y)Z_0|\, d_X\, d_Y \qquad (24)$$

Ra': average surface roughness value (nm),
$S_0$: area when the measuring surface is ideally flat, $|X_R-X_L| \times |Y_T-Y_B|$,
F(X,Y): height at measuring point (X,Y), X is the X-coordinate, and Y is the Y-coordinate,
$X_L$ to $X_R$: range of the X-coordinate of the measuring surface,
$Y_B$ to $Y_T$: range of the Y-coordinate of the measuring surface, and
$Z_0$: average height in the measuring surface.

The surface area ratio Sr is determined by $Sr=S/S_0$ ($S_0$: area when the measuring surface is ideally flat, S: surface area of an actual measuring surface). The surface area of an actual measuring surface is determined as follows: First, the surface is divided into minute triangles formed by most neighboring three data points (A,B,C), and the area ΔS of each minute triangle is determined by the vector product: ΔS (ΔABC)=[s (s−AB) (s−BC)(s−AC)]×0.5 [wherein, AB, BC, and AC represent the lengths of the respective sides, s≅0.5×(AB+BC+AC)]. That is, the sum total of ΔS is the surface area S to be determined. When the surface density of fine texture has an Ra' of 5 nm or more and an Sr of 1.1 or more, the textured structure can exhibit an antireflection effect. In a case of an Ra' of 10 nm or more and an Sr of 1.15 or more, the antireflection effect is higher than that of the former, and in a case of an Ra' of 15 nm or more and an Sr of 1.2 or more, the antireflection performance becomes a level that can be actually used. However, in a case of an Ra' of 100 nm or more and an Sr of 3.5 or more, the scattering effect by the textured structure is higher than the antireflection effect, resulting in insufficient antireflection performance.

In the present invention, when the layer 3 having a fine textured structure includes aluminum oxide as a main component, a metal film of Al alone or a metal film of Al and either of Zn or Mg is formed on the layer 2 having polyimide as a main component, and then the film is immersed in hot water at 50° C. or more or is exposed to water vapor. At this time, a textured structure 4 is formed on the metal film surface by hydration, dissolution, and reprecipitation. Alternatively, a layer having aluminum oxide as a main component may be formed on the layer 2 having polyimide as a main component. In also this case, a fine textured structure 4 can be formed on the layer by immersion in hot water or exposure to water vapor as in above. The above-mentioned layer having aluminum oxide as a main component can be formed by a known method, for example, a gas phase method such as CVD or PVD, a liquid phase method such as a sol-gel method, or hydrothermal synthesis using an inorganic salt. In the method of providing a plate crystal of aluminum oxide, an amorphous aluminum oxide layer may remain under the fine textured structure 4 in the layer 3 having a fine textured structure.

From the viewpoint of capable of forming an uniform reflection-preventing layer on a substrate having a large area or a non-flat surface, a gel film formed by application of a sol-gel coating solution containing aluminum oxide is treated with hot water to allow an alumina plate crystal to grow.

As the raw material of the gel film formed from a gel-sol coating solution containing aluminum oxide, an Al compound or a combination of an Al compound and at least one compound selected from Zr, Si, Ti, Zn, and Mg compounds is used. As raw materials for $Al_2O_3$, $ZrO_2$, $SiO_2$, $TiO_2$, ZnO, and MgO, a metal alkoxide, chloride, or salt compound, such as a nitrate, of each metal can be used. From the viewpoint of film-forming properties, metal alkoxides can be particularly used as raw materials for $ZrO_2$, $SiO_2$, and $TiO_2$.

Examples of the aluminum compound include aluminum ethoxide, aluminum isopropoxide, aluminum-n-butoxide, aluminum-sec-butoxide, aluminum-tert-butoxide, and aluminum acetylacetonate; oligomers thereof; and aluminum nitrate, aluminum chloride, aluminum acetate, aluminum phosphate, aluminum sulfate, and aluminum hydroxide.

Specific examples of zirconium alkoxide include zirconium tetramethoxide, zirconium tetraethoxide, zirconium tetra-n-propoxide, zirconium tetraisopropoxide, zirconium tetra-n-butoxide, and zirconium tetra-t-butoxide.

As the silicon alkoxide, those represented by a formula $Si(OR)_4$ can be used. In the formula, Rs may be the same or different, and examples of R include lower alkyl groups such as a methyl group, an ethyl group, a propyl group, an isopropyl group, a butyl group, and an isobutyl group.

Examples of the titanium alkoxide include tetramethoxy titanium, tetraethoxy titanium, tetra-n-propoxy titanium, tetraisopropoxy titanium, tetra-n-butoxy titanium, and tetraisobutoxy titanium.

Examples of the zinc compound include zinc acetate, zinc chloride, zinc nitrate, zinc stearate, zinc oleate, and zinc salicylate. In particular, zinc acetate and zinc chloride can be used.

Examples of the magnesium compound include magnesium alkoxides, such as dimethoxy magnesium, diethoxy magnesium, dipropoxy magnesium, and dibutoxy magnesium, magnesium acetylacetonate, and magnesium chloride.

The organic solvent may be any one that does not gelate raw materials such as the above-mentioned alkoxides. Examples of the organic solvent include alcohols such as methanol, ethanol, 2-propanol, 1-butanol, 2-butanol, isobutanol, 1-pentanol, 2-pentanol, 3-pentanol, 2-methyl-1-butanol, 3-methyl-2-butanol, isoamyl alcohol, cyclopentanol, 1-hexanol, 2-hexanol, 3-hexanol, 2-methyl-1-pentanol, 4-methyl-2-pentanol, 2,4-dimethylpentanol, and 2-ethyl-1-butanol; glycol or glycol ethers such as ethylene glycol, methylcellosolve, ethylcellosolve, propylcellosolve, isopropylcellosolve, butylcellosolve, 1-methoxy-2-propanol, 1-ethoxy-2-propanol, and 1-propoxy-2-propanol; aliphatic or alicyclic hydrocarbons such as n-hexane, n-octane, cyclohexane, cyclopentane, and cyclooctane; aromatic hydrocarbons such as toluene, xylene, and ethylbenzene; esters such as ethyl formate, ethyl acetate, n-butyl acetate, ethylene glycol monomethyl ether acetate, ethylene glycol monoethyl ether acetate, and ethylene glycol monobutyl ether acetate; ketones such as acetone, methyl ethyl ketone, methyl isobutyl ketone, cyclopentanone, and cyclohexanone; ethers such as dimethoxyethane, tetrahydrofuran, dioxane, diisopropyl ether, and dibutyl ether; chlorinated hydrocarbons such as chloroform, methylene chloride, carbon tetrachloride, and tetrachloroethane; and aprotic polar solvents such as N-methylpyrrolidone, dimethylformamide, dimethylacetamide, and ethylene carbonate. From the viewpoint of solution stability, alcohols can be used among the above-mentioned solvents.

In the cases of using alkoxide raw materials, in particular, alkoxides of aluminum, zirconium, and titanium have high reactivity with water and are rapidly hydrolyzed by moisture in the air or addition of water to cause white turbidity or precipitation. In aluminum salt compounds, zinc salt compounds, and magnesium salt compounds, it is difficult to dissolve such a compound in an organic solvent only, and stability of the resulting solution is low. Accordingly, in order to prevent this problem, a stabilizer is added to a solution for stabilizing the solution.

Examples of the stabilizer include β-diketone compounds such as acetylacetone, dipivaloylmethane, trifluoroacetylacetone, hexafluoroacetylacetone, benzoylacetone, dibenzoylmethane, 3-methyl-2,4-pentanedione, 3-ethyl-2,4-pentanedione, 3-butyl-2,4-pentanedione, 3-phenyl-2,4-pentanedione, and 3-chloroacetylacetone; β-ketoester compounds such as methyl acetoacetate, ethyl acetoacetate, allyl acetoacetate, benzyl acetoacetate, isopropyl acetoacetate, tert-butyl acetoacetate, iso-butyl acetoacetate, 2-methoxyethyl acetoacetate, and methyl 3-keto-n-valerate; and alkanolamines such as monoethanolamine, diethanolamine, and triethanolamine. The molar ratio of the stabilizer to the alkoxide or the salt compound can be about 1. In addition, after addition of the stabilizer, a catalyst may be added to the solution for accelerating part of the reaction in order to form an appropriate precursor. Examples of the catalyst include nitric acid, hydrochloric acid, sulfuric acid, phosphoric acid, acetic acid, and ammonia. As the method of forming a film using the sol-gel coating solution, a known application process, for example, dipping, spin coating, spraying, printing, flow coating, or a combination thereof, can be appropriately employed.

The applied sol-gel coating solution is heat treated at a temperature range of 100° C. or more and 230° C. or less. Heat treatment at a higher temperature tends to densify the film, but a heat treatment temperature exceeding 230° C. causes damage such as deformation in the substrate. The heat treatment temperature is preferably 120° C. or more and 200° C. or less. The heating time is not shorter than 10 min and varies depending on the heat temperature.

The outermost surface textured shape is formed by immersing the dried or heat treated gel film in hot water to deposit a plate crystal containing aluminum oxide as a main component. The outer layer of the gel film containing aluminum oxide is peptized by immersion in hot water to cause partial elution of the component. The plate crystal containing aluminum oxide as a main component is deposited and grows on the outer layer of the gel film due to the difference in solubility of hydroxides in hot water. The temperature of the hot water is 40° C. to 100° C., and the treating time with hot water is about 5 min to about 24 hr.

In the case where the gel film having aluminum oxide as a main component further contains an oxide such as $TiO_2$, $ZrO_2$, $SiO_2$, ZnO, or MgO as a different kind of component, crystallization of the gel film is performed using the difference in solubility of components in hot water. Accordingly, the size of the plate crystal can be controlled over a broad range by changing the composite of inorganic components, unlike the hot water treatment of a film made of aluminum oxide only. As a result, the textured shape formed by the plate crystal can be controlled over a broad range. Furthermore, in the case of using ZnO as an accessory component, codeposition with aluminum oxide is possible. Consequently, the refractive index can be further controlled over a broad range, realizing of excellent antireflection performance.

Examples of the substrate 1 used in the present invention include glass substrates, resin substrates, glass mirrors, and resin mirrors. Typical examples of the resin substrate include films and molded products of thermoplastic resins such as polyester, triacetyl cellulose, cellulose acetate, polyethylene terephthalate, polypropylene, polystyrene, polycarbonate, polysulfone, polyacrylate, polymethacrylate, ABS resins, polyphenylene oxide, polyurethane, polyethylene, polycycloolefin, and polyvinyl chloride; and cross-linked films and cross-linked molded products formed from thermosetting resins such as unsaturated polyester resins, phenol resins, cross-linked polyurethane, cross-linked acrylic resins, and cross-linked saturated polyester resins. Specific examples of the glass substrate include non-alkali glass and aluminosilicate glass substrates. In the present invention, any substrate that can be formed into a shape in accordance with the final intended use can be used. For example, a plate, film, or sheet is used, and the substrate may have a two-dimensional or three-dimensional curved surface. The thickness of the substrate is appropriately determined and is usually 5 mm or less, but is not limited thereto.

The optical member of the present invention may have a functional layer, in addition to the above-described layers. For example, antireflection performance can be increased by disposing a layer having a main component other than polyimide between the substrate 1 and the layer 2 having polyimide as a main component and/or between the layer 2 having polyimide as a main component and the layer 3 having a fine textured structure. Furthermore, on the layer having the fine textured structure, a hard coat layer may be disposed for improving the film hardness, or a water-repellent film layer of fluoroalkylsilane or alkylsilane may be disposed for preventing adhesion of dirt. In order to improve the adhesiveness between the substrate and the layer having polyimide as a main component, an adhesive layer or a primer layer may be provided.

EXAMPLES

The present invention will be described more specifically with reference to examples below, but is not limited to the examples. Each optical film having fine texture on the surface thereof prepared in each example or comparative example was evaluated by the following methods.

(1) Synthesis of Polyimides 1 to 10

Diamine (1), diamine (2), and diamine (3) in a total amount of 0.012 mole were dissolved in N,N-dimethylacetamide (hereinafter, abbreviated as DMAc). To this diamine solution, 0.012 mole of an acid dianhydride was added while cooling the solution with water. The amount of DMAc was adjusted so that the total mass of the diamine and the acid dianhydride was 20% by weight. This solution was stirred at room temperature for 15 hr for polymerization. Then, the solution was diluted with DMAc to 8% by weight, and 7.4 mL of pyridine and 3.8 mL of acetic anhydride were added thereto, followed by stirring at room temperature for 1 hr and then in an oil bath with heating at 50° C. to 80° C. for 4 hr. The resulting polymer solution was reprecipitated in methanol to extract the polymer. The polymer was washed in methanol several times and was then dried in vacuum at 100° C. to obtain polyimide as a white to light yellow powder. The remaining quantity of carboxyl group was determined from the $^1$H-NMR spectrum to calculate the imidization ratio. Table 1 shows compositions of polyimides 1 to 10.

TABLE 1

| Polyimide | Acid dianhydride | Diamine (1) | Diamine (2) | Diamine (3) | Yield % | Imidization rate % |
|---|---|---|---|---|---|---|
| Polyimide 1 | TDA(1.0) | DADCM(0.9) | PAM-E(0.1) | — | 93 | 99.2 |
| Polyimide 2 | TDA(1.0) | DADCM(0.9) | PAM-E(0.1) | — | 90 | 96.5 |
| Polyimide 3 | TDA(1.0) | DADCM(0.7) | PAM-E(0.3) | — | 92 | 99.0 |
| Polyimide 4 | TDA(1.0) | Purified DADCM(0.7) | PAM-E(0.3) | — | 93 | 98.8 |
| Polyimide 5 | TDA(0.98) | Purified DADCM(0.4) | BAPB(0.4) | PAM-E(0.2) | 93 | 99.1 |
| Polyimide 6 | TDA(1.0) | Purified DADCM(0.4) | BAPB(0.4) | PAM-E(0.2) | 89 | 95.0 |
| Polyimide 7 | TDA(0.97) | BAPB(0.9) | PAM-E(0.1) | — | 93 | 99.5 |
| Polyimide 8 | TDA(0.97) | BAPP(0.9) | PAM-E(0.1) | — | 92 | 99.2 |
| Polyimide 9 | B-4400(0.98) | Purified DADCM(0.4) | BAPB(0.4) | PAM-E(0.2) | 90 | 99.0 |
| Polyimide 10 | B-4400(1.0) | Purified DADCM(0.7) | PAM-E(0.3) | — | 87 | 98.5 |

TDA: 4-(2,5-dioxotetrahydrofuran-3-yl)-1,2,3,4-tetrahydronaphthalene-1,2-dicarboxylic anhydride
B-4400: 5-(2,5-dioxotetrahydrofuryl)-3-methyl-3-cyclohexene-1,2-dicarboxylic anhydride
DADCM: 4,4'-methylenebis(aminocyclohexane) (marketed product)
Purified DADCM: 4,4'-methylenebis(aminocyclohexane) (product recrystallized from hexane)
BAPB: 4,4'-bis(4-aminophenoxy)biphenyl
BAPP: 2,2-bis[4-(4-aminophenoxy)phenyl]propane
PAM-E: 1,3-bis(3-aminopropyl)tetramethyldisiloxane
Numerical values shown in parentheses of the columns of acid dianhydride and diamine are molar ratios.

(2) Preparation of Polyimide Solutions 1 to 23

To 96 to 98 g of solvent mixture of cyclopentanone and cyclohexanone, 2.0 g of a powder of any of polyimides 1 to 8 was added. The resulting mixture was stirred at room temperature for complete dissolution, and 0.002 to 0.08 g of a silane compound was added to the resulting solution, followed by stirring at 23° C. to 50° C. for 2 hr. Then, 0.2 g of water was added thereto, followed by stirring for 1 hr to prepare each of polyimide solutions 1 to 23. Table 2 shows compositions of polyimide solutions 1 to 23.

(3) Preparation of Aluminum Oxide (Alumina: $Al_2O_3$) Sol

A mixture of 22.2 g of Al(O-sec-Bu)$_3$ and 5.86 g of 3-oxobutanoic acid ethyl ester and 4-methyl-2-pentanol was stirred to become uniform. A solution prepared by dissolving 1.62 g of 0.01 M of dilute hydrochloric acid in a solvent mixture of 4-methyl-2-pentanol and 1-ethoxy-2-propanol was gradually added to the Al(O-sec-Bu)$_3$ solution prepared above, followed by stirring for a while. The solvent was adjusted to be finally a solvent mixture of 49.3 g of 4-methyl-2-pentanol and 21.1 g of 1-ethoxy-2-propanol. An aluminum

TABLE 2

| | | Silane compound | | |
|---|---|---|---|---|
| Polyimide solution | Polyimide | Type | Amount (parts by weight*) | Reaction temperature (° C.) |
| Polyimide solution 1 | Polyimide 1 | 3-(triethoxysilyl)propyl isocyanate | 2 | 23 |
| Polyimide solution 2 | Polyimide 2 | 3-(triethoxysilyl)propyl isocyanate | 2 | 23 |
| Polyimide solution 3 | Polyimide 3 | 3-(triethoxysilyl)propyl isocyanate | 2 | 23 |
| Polyimide solution 4 | Polyimide 4 | 3-(triethoxysilyl)propyl isocyanate | 2 | 23 |
| Polyimide solution 5 | Polyimide 5 | 3-(triethoxysilyl)propyl isocyanate | 0.5 | 23 |
| Polyimide solution 6 | Polyimide 5 | 3-(triethoxysilyl)propyl isocyanate | 2 | 23 |
| Polyimide solution 7 | Polyimide 5 | 3-(triethoxysilyl)propyl isocyanate | 4 | 23 |
| Polyimide solution 8 | Polyimide 5 | 3-(triethoxysilyl)propyl isocyanate | 2 | 50 |
| Polyimide solution 9 | Polyimide 5 | 3-(triethoxysilyl)propyl isocyanate | 2 | 23 |
| Polyimide solution 10 | Polyimide 6 | 3-(triethoxysilyl)propyl isocyanate | 2 | 23 |
| Polyimide solution 11 | Polyimide 7 | 3-(triethoxysilyl)propyl isocyanate | 2 | 23 |
| Polyimide solution 12 | Polyimide 8 | 3-(triethoxysilyl)propyl isocyanate | 2 | 23 |
| Polyimide solution 13 | Polyimide 9 | 3-(triethoxysilyl)propyl isocyanate | 2 | 23 |
| Polyimide solution 14 | Polyimide 10 | 3-(triethoxysilyl)propyl isocyanate | 2 | 23 |
| Polyimide solution 15 | Polyimide 5 | 3-(triethoxysilyl)propyl isocyanate | 0.1 | 23 |
| Polyimide solution 16 | Polyimide 4 | — | 0 | 23 |
| Polyimide solution 17 | Polyimide 5 | — | 0 | 23 |
| Polyimide solution 18 | Polyimide 7 | — | 0 | 23 |
| Polyimide solution 19 | Polyimide 10 | — | 0 | 23 |
| Polyimide solution 20 | Polyimide 5 | 3-aminopropyltriethoxysilane | 2 | 23 |
| Polyimide solution 21 | Polyimide 5 | 3-glycidyloxypropyltrimethoxysilane | 2 | 23 |
| Polyimide solution 22 | Polyimide 5 | 3-mercaptopropyltrimethoxysilane | 2 | 23 |
| Polyimide solution 23 | Polyimide 5 | ethyl silicate | 2 | 23 |

*The amount of silane compound based on 100 parts by weight of polyimide.

oxide precursor sol was prepared by furthermore stirring the solution in an oil bath at 120° C. for at least 3 hr.

(4) Washing of Substrate

Each of glass substrate having a diameter of about 30 mm and a thickness of about 2 mm was polished on one side, ultrasonic washed with an alkali detergent and IPA, and then dried in an oven.

(5) Measurement of Reflectance

Reflectance was measured at an incident angle of 0° in the range of 400 to 700 nm with an absolute reflectance measurement apparatus (USPM-RU, manufactured by Olympus Corp.). The average of reflectances at 400 to 700 nm was defined as an average reflectance.

(6) Measurement of Thickness and Refractive Index

Thicknesses and refractive indices were measured in the wavelength range of 380 to 800 nm with a spectroscopic ellipsometer (VASE, manufactured by J. A. Woollam Co., Inc.).

(7) Observation of Substrate Surface

The substrate surface was treated with Pd/Pt, and the surface was observed at an accelerating voltage of 2 kV using a field emission scanning electron microscope (FE-SEM) (S-4800, manufactured by Hitachi High-Technologies Corp.).

Examples 1 to 4

An appropriate amount of any of the polyimide solutions 1 to 4 was dropped onto the polished surface of a washed glass substrate A containing $TiO_2$ as a main component and having nd=1.762 and vd=26.5, followed by spin coating at 4000 rpm. This substrate was dried at 200° C. for 60 min to provide the substrate with any of polyimide films where the polyimides 1 to 4 respectively represented by the following Formulae (8) to (11) were modified with 3-(triethoxysilyl)propyl isocyanate represented by the following Formula (12). The thickness and the refractive index of each of the polyimide films were measured with an ellipsometer.

Polymide 1 (imidization ratio: 99.2%)

Polymide 2 (imidization ratio: 96.5%)

Polymide 3 (imidization ratio: 99.0%)

Polymide 4 (imidization ratio: 98.8%)

3-(Triethoxysilyl)propyl isocyanate

An appropriate amount of an aluminum oxide precursor sol was dropped onto the polyimide film, followed by spin coating at 4000 rpm. The applied sol was baked in an oven with internal air circulation at 200° C. for 120 min to form an amorphous aluminum oxide coating on the polyimide film.

Then, the substrate was immersed in hot water of 75° C. for 20 min and was then dried at 60° C. for 15 min.

The resulting film surface was observed with an FE-SEM to confirm that a fine textured structure of a plate crystal containing aluminum oxide as a main component is formed randomly and intricately.

The absolute reflectance of the optical film on the glass substrate A was measured to confirm that the glass substrate was provided with an antireflection film having an average reflectance of 0.08% at 400 to 700 nm. Furthermore, no detachment, cracking, and coloring of the film were observed.

Examples 5 to 9

The same process as that in Examples 1 to 4 was conducted using a washed glass substrate B containing $TiO_2$ as a main component and having nd=1.847 and νd=23.8 instead of the glass substrate A and using polyimide solutions 5 to 9 instead of the polyimide solutions 1 to 4.

Thus, a polyimide film 5 where the polyimide 5 represented by the following Formula (13) was modified with 3-(triethoxysilyl)propyl isocyanate or 3-(trimethoxysilyl)propyl isocyanate represented by the following Formula (14) was formed on the glass substrate B. Though the type of the silane compound, its amount, and conditions for addition were different from those in Examples 1 to 4, no large differences were observed in the thickness and the refractive index of the polyimide film 5.

TABLE 3

| Example | Polyimide solution | Substrate | Polyimide monolayer Thickness (nm) | Refractive index (at 550 nm) | Antireflection film (after formation of textured structure) Film condition | Average reflectance (%) at 400 to 700 nm |
|---|---|---|---|---|---|---|
| Example 1 | Polyimide solution 1 | glass substrate A | 45 | 1.561 | ⊙ | 0.08 |
| Example 2 | Polyimide solution 2 | glass substrate A | 46 | 1.561 | ⊙ | 0.08 |
| Example 3 | Polyimide solution 3 | glass substrate A | 44 | 1.558 | ⊙ | 0.08 |
| Example 4 | Polyimide solution 4 | glass substrate A | 43 | 1.558 | ⊙ | 0.08 |
| Example 5 | Polyimide solution 5 | glass substrate B | 45 | 1.620 | ⊙ | 0.07 |
| Example 6 | Polyimide solution 6 | glass substrate B | 46 | 1.618 | ⊙ | 0.07 |
| Example 7 | Polyimide solution 7 | glass substrate B | 47 | 1.616 | ⊙ | 0.07 |
| Example 8 | Polyimide solution 8 | glass substrate B | 45 | 1.618 | ⊙ | 0.07 |
| Example 9 | Polyimide solution 9 | glass substrate B | 45 | 1.618 | ⊙ | 0.07 |
| Example 10 | Polyimide solution 10 | glass substrate B | 47 | 1.614 | ○ | 0.08 |
| Example 11 | Polyimide solution 11 | glass substrate B | 45 | 1.683 | ⊙ | 0.10 |
| Example 12 | Polyimide solution 12 | glass substrate B | 46 | 1.632 | ⊙ | 0.08 |
| Example 13 | Polyimide solution 13 | glass substrate B | 46 | 1.603 | ⊙ | 0.07 |
| Example 14 | Polyimide solution 14 | glass substrate C | 45 | 1.536 | ⊙ | 0.08 |
| Example 15 | Polyimide solution 15 | glass substrate B | 45 | 1.618 | Δ cracking | 0.08 |
| Comparative Example 1 | Polyimide solution 16 | glass substrate A | 43 | 1.558 | Δ partial detachment | 0.08 |
| Comparative Example 2 | Polyimide solution 17 | glass substrate B | 45 | 1.620 | Δ partial detachment | 0.07 |
| Comparative Example 3 | Polyimide solution 18 | glass substrate B | 45 | 1.686 | Δ partial detachment | 0.10 |
| Comparative Example 4 | Polyimide solution 19 | glass substrate C | 45 | 1.536 | Δ partial detachment | 0.08 |
| Comparative Example 5 | Polyimide solution 20 | glass substrate B | 52 | 1.618 | Δ coloring | 0.15 |
| Comparative Example 6 | Polyimide solution 21 | glass substrate B | 46 | 1.618 | Δ partial detachment | 0.07 |
| Comparative Example 7 | Polyimide solution 22 | glass substrate B | 46 | 1.618 | Δ partial detachment | 0.07 |
| Comparative Example 8 | Polyimide solution 23 | glass substrate B | 46 | 1.617 | Δ partial detachment | 0.07 |

(13)

Polyimide 5 (imidization ratio: 99.1%)

(14)

3-(Trimethoxysilyl)propyl isocyanate

A plate crystal containing aluminum oxide as a main component was formed on the polyimide film 5 to provide the glass substrate with an antireflection film having an average reflectance of 0.07% to 0.1% at 400 to 700 nm. No detachment, cracking, and coloring of the film were observed.

Example 10

The same process as that in Examples 1 to 4 was conducted using a washed glass substrate B containing $TiO_2$ as a main component and having nd=1.847 and vd=23.8 instead of the glass substrate A and using polyimide solution 10 instead of the polyimide solutions 1 to 4.

Thus, a polyimide film 6 where the polyimide 6 represented by the following Formula (15) was modified with 3-(triethoxysilyl)propyl isocyanate was formed on the glass substrate B. A plate crystal containing aluminum oxide as a main component was formed on the polyimide film 6 to provide the glass substrate with an antireflection film having an average reflectance of 0.08% at 400 to 700 nm. No detachment, cracking, and coloring of the film were observed whereas partial nonuniform reflectance was observed.

(15)

Polyimide 6 (imidization ratio: 95.0%)

Examples 11 to 13

The same process as that in Examples 1 to 4 was conducted using a washed glass substrate B containing $TiO_2$ as a main component and having nd=1.847 and vd=23.8 instead of the glass substrate A and using polyimide solutions 11 to 13 instead of the polyimide solutions 1 to 4.

Thus, polyimide films 7 to 9 where the polyimides 7 to 9 respectively represented by the following Formulae (16) to (18) were modified with 3-(triethoxysilyl)propyl isocyanate were formed on the respective glass substrates B. Then, a plate crystal containing aluminum oxide as a main component was formed on each of the polyimide films to form an optical film having an average reflectance of 0.07% to 0.1% at 400 to 700 nm. No detachment, cracking, and coloring of the film were observed.

Example 14

The same process as that in Examples 1 to 4 was conducted using a washed glass substrate C containing $TiO_2$ as a main component and having nd=1.728 and vd=28.5 instead of the glass substrate A and using polyimide solution 14 instead of the polyimide solutions 1 to 4.

Thus, a polyimide film 10 where the polyimide 10 represented by the following Formula (19) was modified with 3-(triethoxysilyl)propyl isocyanate was formed on the glass substrate C. Then, a plate crystal containing aluminum oxide as a main component was formed on the polyimide film 10 to provide the glass substrate with an antireflection film having an average reflectance of 0.08% at 400 to 700 nm. No detachment, cracking, and coloring of the film were observed.

(16)

Polyimide 7 (imidization ratio: 99.5%)

(17)

Polyimide 8 (imidization ratio: 99.2%)

(18)

Polyimide 9 (imidization ratio: 99.0%)

(19)

Polyimide 10 (imidization ratio: 98.5%)

Example 15

The same process as that in Examples 1 to 4 was conducted using a washed glass substrate B containing $TiO_2$ as a main component and having nd=1.847 and vd=23.8 instead of the glass substrate A and using polyimide solution 15 instead of the polyimide solutions 1 to 4.

Thus, a polyimide film 15 where the polyimide 5 was modified with 0.1 parts by weight of 3-(triethoxysilyl)propyl isocyanate was formed on the glass substrate B. However, cracking occurred in the step of forming a plate crystal containing aluminum oxide as a main component by immersing the film in hot water. The average reflectance of a portion not having cracking was 0.08% at 400 to 700 nm. No detachment of the film was observed whereas cracking occurred.

Comparative Example 1

The same process as that in Examples 1 to 4 was conducted using the polyimide solution 16 instead of the polyimides 1 to 4.

A polyimide film 4 was produced on the glass substrate A without modifying the polyimide. However, cracking occurred in a part of the sample during the step of forming a plate crystal containing aluminum oxide as a main component by immersing the film in hot water, and partial detachment was observed between the glass substrate A and the polyimide film 4. The average reflectance of a portion not having detachment was 0.08% at 400 to 700 nm.

Comparative Examples 2 and 3

The same process as that in Examples 1 to 4 was conducted using a washed glass substrate B containing $TiO_2$ as a main component and having nd=1.847 and vd=23.8 instead of the glass substrate A and using polyimide solutions 17 and 18 instead of the polyimide solutions 1 to 4.

A polyimide film 5 or 7 was produced on the glass substrate B without modifying the polyimide. However, cracking occurred in a part of each sample during the step of forming a plate crystal containing aluminum oxide as a main component by immersing the film in hot water, and partial detachment was observed between the glass substrate B and the polyimide film. The average reflectance of a portion not having detachment was 0.07% to 0.1% at 400 to 700 nm.

Comparative Example 4

The same process as that in Examples 1 to 4 was conducted using a washed glass substrate C containing $TiO_2$ as a main component and having nd=1.728 and vd=28.5 instead of the glass substrate A and using polyimide solution 19 instead of the polyimide solutions 1 to 4.

A polyimide film 10 was produced on the glass substrate C without modifying the polyimide. However, cracking occurred in a part of the sample during the step of forming a plate crystal containing aluminum oxide as a main component by immersing the film in hot water, and partial detachment was observed between the glass substrate C and the polyimide film 10. The average reflectance of a portion not having detachment was 0.08% at 400 to 700 nm.

Comparative Example 5 to 8

The same process as that in Examples 1 to 4 was conducted using a washed glass substrate B containing $TiO_2$ as a main component and having nd=1.847 and vd=23.8 instead of the glass substrate A and using polyimide solutions 20 to 23 instead of the polyimide solutions 1 to 4.

A polyimide film 5 having any of silane compounds respectively represented by Formulae (20) to (23) not having an isocyanate group was formed on a glass substrate B. However, in the polyimide solution 20 containing 3-aminopropyltriethoxysilane, thickening and yellowing were observed even at the time of preparing the solution, and thickening and yellowing were observed also in the resulting polyimide film 5. A polyimide film and a plate crystal containing aluminum oxide as a main component were formed in this order to form an optical film having an average reflectance of 0.15% at 400 to 700 nm.

(20)

3-Aminopropyltriethoxysilane (21)

3-Glycidyloxypropyltrimethoxysilane (22)

3-Mercaptopropyltrimethoxysilane (23)

Ethyl silicate

In the case of using other polyimide solutions, cracking occurred during the step of forming a plate crystal containing aluminum oxide as a main component by immersing the film in hot water, and partial detachment was observed between the glass substrate B and the polyimide film. The average reflectance of a portion not having cracking and detachment was 0.07% at 400 to 700 nm.

The optical member of the present invention can correspond to any refractive index of a transparent substrate, shows an excellent antireflection effect for visible light, and has a high long-term weather resistance. Accordingly, the optical member can be used in various displays of, for example, a word processor, a computer, a television, and a plasma display panel; can be used as an optical member of polarizers used in liquid crystal displays, various optical glass materials, and sunglass lenses, prescription glass lenses, finder lenses for cameras, prisms, fly-eye lenses, toric lenses, various optical filters, and sensors formed from transparent plastics; can be used in photographing optical systems, observation optical systems such as binoculars, and projecting optical systems used in liquid crystal projectors; can be used as various optical lenses such as scanning optical systems used in, for example, laser beam printers; and can be used as an optical member such as covers of various meters and window glasses of, for example, automobiles and electric trains.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-009059 filed Jan. 19, 2011, which is hereby incorporated by reference herein in its entirety.

What is claimed is:

1. An optical member comprising:
a plurality of layers formed on a surface of a substrate, wherein
the plurality of layers includes layer having a textured structure comprising a crystal of aluminum oxide and layer having polyimide; and
the polyimide includes a repeated structure represented by Formula (1) and a structure represented by Formula (2) in a main chain:

(1)

wherein, $R_1$ represents a tetravalent organic group; and $R_2$ represents a divalent organic group, and (2)

wherein, $R_3$ represents a tetravalent organic group; $R_4$ represents a phenylene group or a C1 to C5 alkylene group; $R_5$ represents a hydrogen atom, a linear or branched alkyl group, or a phenyl group or represents a structure binding to the substrate or another polymer through —Si≡; $R_6$ represents a hydrogen atom, a linear or branched alkyl group, or a phenyl group; m represents 0 or 1; n represents 1 or 2; m and n satisfy 2m+2n=4; and x represents an integer of 1 to 3,
wherein the molar quantity of the structure represented by Formula (2) contained in the polyimide is 0.002 to 0.05 based on 1 mole of the repeating unit represented by Formula (1) contained in the polyimide.

2. The optical member according to claim 1, wherein the polyimide has a structure represented by Formula (3) at a terminal:

(3)

wherein, $R_7$ represents a tetravalent organic group; $R_8$ represents a methyl group, an ethyl group, or an isopropyl group; $R_9$ represents a phenylene group or a C1 to C5 alkylene group; $R_{10}$ represents a hydrogen atom, a C1 to C5 linear or branched alkyl group, or a phenyl group or represents a structure binding to the substrate or another polymer through —Si≡; $R_{11}$ represents a hydrogen atom, a linear or branched alkyl group, or a phenyl group; y represents an integer of 1 to 3; and p represents 0 or 1.

3. The optical member according to claim 1, wherein the polyimide has a structure represented by Formula (4) at a terminal:

(4)

wherein $R_{12}$ represents a tetravalent organic group; $R_{13}$ represents a divalent organic group; and $R_{14}$ represents a C1 to C3 alkyl group or a fluoroalkyl group.

4. The optical member according to claim 1, wherein the layer having polyimide has a thickness of 10 nm or more and 150 nm or less.

5. The optical member according to claim 1, wherein the layer having polyimide is in direct contact with the substrate.

6. A photographing optical system comprising the optical member according to claim 1.

7. An observation optical system comprising the optical member according to claim 1.

8. A projecting optical system comprising the optical member according to claim 1.

9. The optical member according to claim 1, wherein polyimide contains a polyimide structure formed by the repeating structure represented by Formula (1) and the structure represented by Formula (2) as a main component.

10. The optical member according to claim 9, wherein an amount of a component that is other than the polyimide structure formed by the repeating structure represented by Formula (1) and the structure represented by Formula (2), in an amount of less than 20 parts by weight based on 100 parts by weight of the polyimide structure.

11. The optical member according to claim 1, wherein an imidization ratio of the polyimide is 96% or more and 99.8% or less.

12. The optical member according to claim 1, wherein the layer having a textured structure is formed by treating aluminum oxide in hot water of 40° C. or more and 100° C. or less.

* * * * *